(12) United States Patent
Sugawara et al.

(10) Patent No.: US 10,850,765 B2
(45) Date of Patent: Dec. 1, 2020

(54) ELECTRIC POWER STEERING SYSTEM

(71) Applicant: NSK LTD., Tokyo (JP)

(72) Inventors: Takayoshi Sugawara, Tokyo (JP);
Takuya Masuko, Tokyo (JP); Tomoki Fukuda, Tokyo (JP); Hideki Sawada, Tokyo (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/630,664

(22) PCT Filed: Jun. 7, 2019

(86) PCT No.: PCT/JP2019/022695
§ 371 (c)(1),
(2) Date: Jan. 13, 2020

(87) PCT Pub. No.: WO2019/235609
PCT Pub. Date: Dec. 12, 2019

(65) Prior Publication Data
US 2020/0269905 A1    Aug. 27, 2020

(30) Foreign Application Priority Data
Jun. 7, 2018    (JP) .................. 2018-109571

(51) Int. Cl.
*B62D 5/04* (2006.01)
*B62D 15/02* (2006.01)
(Continued)

(52) U.S. Cl.
CPC .......... *B62D 5/0463* (2013.01); *B62D 5/005* (2013.01); *B62D 5/0472* (2013.01); *B62D 6/008* (2013.01); *B62D 15/029* (2013.01)

(58) Field of Classification Search
CPC .... B62D 5/005; B62D 5/0463; B62D 5/0472; B62D 5/008; B62D 15/029
(Continued)

(56) References Cited

U.S. PATENT DOCUMENTS

| 9,358,925 B2 | 6/2016 | Kariatsumari et al. |
| 10,026,319 B2 | 7/2018 | Wu |

(Continued)

FOREIGN PATENT DOCUMENTS

| JP | 06-076200 A | 3/1994 |
| JP | 2000-062635 A | 2/2000 |

(Continued)

OTHER PUBLICATIONS

International Search Report for PCT/JP2019/022695 dated Jul. 9, 2019 [PCT/ISA/210].

(Continued)

*Primary Examiner* — Tan Q Nguyen
(74) *Attorney, Agent, or Firm* — Sughrue Mion, PLLC

(57) ABSTRACT

An electric power steering system is provided that is capable of performing assist control in which a change in a steering feel is reduced. The electric power steering system includes a current command value calculating unit configured to output a current command value Iref1 in accordance with steering torque and a vehicle speed on the basis of an assist map. The current command value calculating unit includes a vibration component reducing section configured to reduce a vibration component resulting from vibrations for warning that have been transmitted to a steering wheel and included in the steering torque.

6 Claims, 10 Drawing Sheets

(51) Int. Cl.
*B62D 5/00* (2006.01)
*B62D 6/00* (2006.01)

(58) Field of Classification Search
USPC .......................................... 701/41
See application file for complete search history.

(56) References Cited

U.S. PATENT DOCUMENTS

| | | | |
|---|---|---|---|
| 2010/0138109 A1* | 6/2010 | Wang ................... | B62D 5/0472 |
| | | | 701/41 |
| 2010/0211263 A1* | 8/2010 | Lindenstruth ........ | B62D 5/0472 |
| | | | 701/41 |
| 2014/0343794 A1* | 11/2014 | Tamaizumi .......... | B62D 5/0472 |
| | | | 701/42 |
| 2017/0193824 A1 | 7/2017 | Wu | |

FOREIGN PATENT DOCUMENTS

| | | |
|---|---|---|
| JP | 2016-047717 A | 4/2016 |
| KR | 10-2015-0083273 A | 7/2015 |
| KR | 10-2015-0092886 A | 8/2015 |

OTHER PUBLICATIONS

Written Opinion for PCT/JP2019/022695 dated Jul. 9, 2019 [PCT/ISA/237].
Communication dated Jun. 25, 2020 by the European Patent Office in application No. 19815958.4.

* cited by examiner

ELECTRIC POWER STEERING SYSTEM

CROSS REFERENCE TO RELATED APPLICATIONS

This application is a National Stage of International Application No. PCT/JP2019/022695 filed Jun. 7, 2019, claiming priority based on Japanese Patent Application No. 2018-109571 filed Jun. 7, 2018.

FIELD

The present invention relates to an electric power steering system.

BACKGROUND

An electric power steering (EPS) system, which is one of the vehicle steering devices, provides an assist force (steering auxiliary force) to a steering system of a vehicle by means of a turning force of a motor. The EPS provides, as an assist force, a driving force of a motor that is controlled by power supplied from an inverter, to a steering shaft or a rack shaft by means of a transfer mechanism including a speed reduction mechanism.

Installation of an advanced driver assistance system (ADAS) that performs driving support, including vehicle control for reducing front collision damage, as typified by autonomous emergency braking, or keeping a lane, and that issues a warning, such as a lane departure warning, a front camera module (FCM) necessary for parking assistance, danger avoidance, autonomous steering, and the like, and an ultrasonic sensor, such as a clearance sonar and a back sonar, has been advancing in recent years.

For example, a lane departure warning system is disclosed that monitors road surface conditions in front or in the rear of a vehicle by using a camera and that, when detecting a departure of the vehicle from a white line on the road surface, warns a driver of the lane departure by exciting a vibration actuator provided to a spoke of a steering wheel (Patent Literature 1, for example).

CITATION LIST

Patent Literature

Patent Literature 1: Japanese Patent Application Laid-open No. H06-076200 A

SUMMARY

Technical Problem

In the conventional technology described above, however, a vibration component of the lane departure warning may be superposed on a detected value of steering torque when assist control is performed, thereby affecting the assist control, which may change a steering feel.

The present invention is made in view of the problem described above, and it is an object of the present invention to provide an electric power steering system capable of performing assist control in which a change in the steering feel is reduced.

Solution to Problem

To achieve the above object, an electric power steering system according to one embodiment of the present invention configured to drive a motor based on an assist map in which a current command value in accordance with steering torque and a vehicle speed is defined and configured to perform assist control on a steering system of a vehicle is disclosed. The electric power steering system includes a current command value calculating unit configured to output a current command value in accordance with the steering torque and the vehicle speed, based on the assist map. The current command value calculating unit includes a vibration component reducing section configured to reduce a vibration component resulting from vibrations for warning that have been transmitted to a steering wheel, the vibration component being included in the steering torque.

According to the structure described above, assist control can be performed in which a change in a steering feel is reduced that is made by the vibration component resulting from the vibrations for warning, such as a lane departure warning.

As a desirable embodiment of the electric power steering system, it is preferable that the current command value calculating unit multiplies a difference value between the steering torque and output from the vibration component reducing section by a predetermined gain factor, and adds a resultant value to the current command value.

In this manner, the current command value can be obtained in which the attenuated frequency component and the compensated phase by the vibration component reducing section.

As a desirable embodiment of the electric power steering system, it is preferable that the current command value calculating unit further includes a gain factor calculating section configured to generate the gain factor in accordance with an absolute value of a torque signal, the torque signal being an output from the vibration component reducing section.

In this manner, the stability of assist control in the electric power steering system can be improved.

As a desirable embodiment of the electric power steering system, it is preferable that the gain factor calculating section generates the gain factor that is proportional to the absolute value of the torque signal.

In this manner, the stability of assist control in the electric power steering system can be improved.

As a desirable embodiment of the electric power steering system, it is preferable that the gain factor calculating section generates the gain factor that approximates an amount of change in the assist map in accordance with the absolute value of the torque signal.

In this manner, the stability of assist control in the electric power steering system can be improved while eliminating a sense of discomfort with the steering feel.

As a desirable embodiment of the electric power steering system, it is preferable that the vibration component reducing section is a primary low-pass filter, a secondary low-pass filter, a notch filter, or a low-pass type notch filter.

In this manner, the torque signal can be obtained in which the vibration component included in the steering torque affected by the vibrations for warning, such as a lane departure warning, has been reduced, thereby reducing a change in the steering feel.

Advantageous Effects of Invention

According to the present invention, an electric power steering system can be provided that is capable of performing assist control in which a change in a steering feel is reduced.

DESCRIPTION OF EMBODIMENTS

Description of embodiments for carrying out the invention (hereinafter referred to as embodiments) will be given in detail below with reference to the drawings. Note that the following embodiments do not limit the present invention. Components in the following embodiments include ones that a person skilled in the art can easily conceive of, ones that are substantially the same, or ones that fall within what is called a range of equivalency. Furthermore, the components disclosed in the following embodiments may also be combined as appropriate.

First Embodiment

Figure 1:
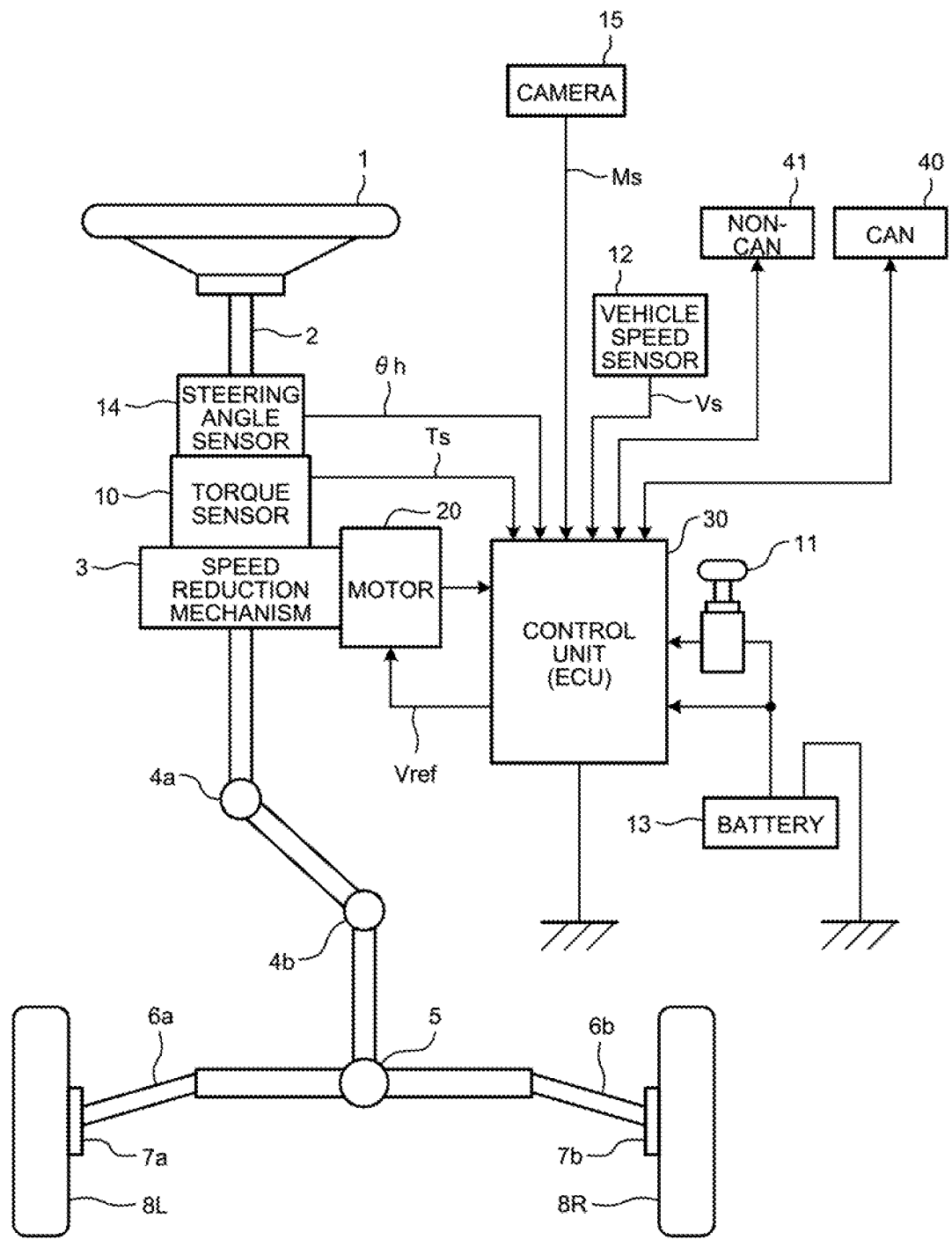
FIG. 1 is a view illustrating a general structure of an electric power steering system.

FIG. 1 is a view illustrating a general structure of an electric power steering system. The electric power steering system is coupled to steered wheels 8L, 8R, in the order in which the force applied by a steering person transmits, by way of a column shaft (a steering shaft, a steering wheel shaft) 2 of a steering wheel 1, a speed reduction mechanism 3, universal joints 4a, 4b, a pinion rack mechanism 5, and tie rods 6a, 6b, and additionally through hub units 7a, 7b. The column shaft 2 having a torsion bar is provided with a torque sensor 10 that detects steering torque Ts of the steering wheel 1 and a steering angle sensor 14 that detects a steering angle θh, and a motor 20 that assists a steering force of the steering wheel 1 is coupled to the column shaft 2 through the speed reduction mechanism 3. To a control unit (ECU) 30 that controls the electric power steering system, power is supplied from a battery 13, and an ignition key signal is also input through an ignition key 11. The control unit 30 calculates a current command value for an assist (steering auxiliary force) command on the basis of the steering torque Ts detected by the torque sensor 10 and a vehicle speed Vs detected by a vehicle speed sensor 12, and controls a current to be supplied to the motor 20 on the basis of a voltage control command value Vref obtained by providing compensation to the current command value, for example.

A camera 15 captures road surfaces in front or in the rear of a vehicle, and sends captured image information Ms to the control unit 30. The camera 15 is exemplified by a CCD camera, for example.

The control unit 30 has a vehicle-mounted network connected thereto, such as a controller area network (CAN) 40, that gives and receives a variety of information on the vehicle. The control unit 30 can also have a non-CAN 41 other than the CAN 40 connected thereto that gives and receives communications, analog/digital signals, radio waves, and the like.

Figure 2:
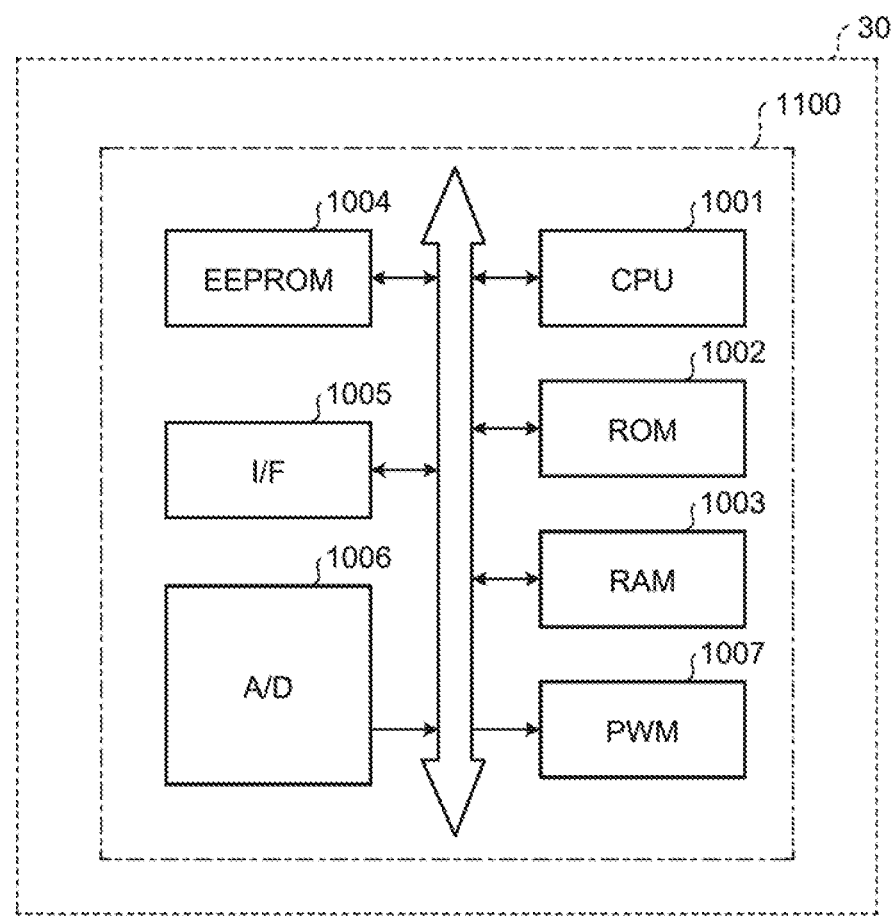
FIG. 2 is a schematic diagram illustrating a hardware structure of a control unit that controls the electric power steering system.

The control unit 30 is mainly made up of a CPU (including an MCU and an MPU). FIG. 2 is a schematic diagram illustrating a hardware structure of the control unit that controls the electric power steering system.

A control computer 1100 that constitutes the control unit 30 includes a central processing unit (CPU) 1001, a read-only memory (ROM) 1002, a random access memory (RAM) 1003, an electrically erasable programmable ROM (EEPROM) 1004, an interface (I/F) 1005, an analog-to-digital (A/D) converter 1006, and a pulse width modulation (PWM) controller 1007, and these are connected to a bus.

The CPU 1001 is a processor that executes a computer program for controlling the electric power steering system (hereinafter referred to as a control program), to control the electric power steering system.

The ROM 1002 stores therein the control program to control the electric power steering system. The RAM 1003 is used as a work memory to operate the control program. The EEPROM 1004 stores therein control data that the control program inputs and outputs, for example. The control data is used on a control computer program that has been unpacked into the RAM 1003 after the power of the control unit 30 was turned on, and overwrites the EEPROM 1004 at a predetermined timing.

The ROM 1002, the RAM 1003, the EEPROM 1004, and the like are storages that store therein information, and are storages (primary storages) that the CPU 1001 can directly access.

The A/D converter 1006 inputs signals of the steering torque Ts, a current detection value Im of the motor 20, and the steering angle θh, for example, and converts them into digital signals.

The interface 1005 is connected to the CAN 40. The interface 1005 accepts a signal of a vehicle speed V (vehicle speed pulse) from the vehicle speed sensor 12.

The PWM controller 1007 outputs respective PWM control signals of U, V, W phases on the basis of a current command value for the motor 20.

Figure 3:
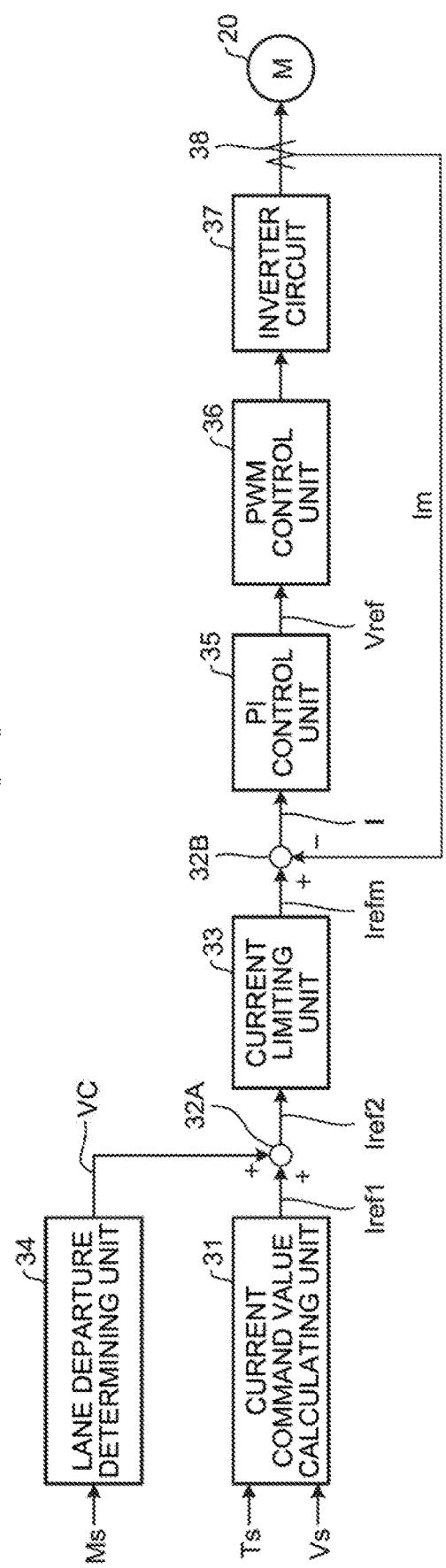
FIG. 3 is a view illustrating an example of an internal block structure of the control unit in the electric power steering system.

FIG. 3 is a view illustrating an example of an internal block structure of the control unit in the electric power steering system.

To a current command value calculating unit 31, the steering torque Ts and the vehicle speed Vs are input. The current command value calculating unit 31 refers to an assist map stored in advance on the basis of the steering torque Ts and the vehicle speed Vs, and calculates and outputs a current command value Iref1, which is a control target value of the current to be supplied to the motor 20. In the present embodiment, the assist map is set in advance and is stored in a storage such as the ROM 1002.

Figure 4:
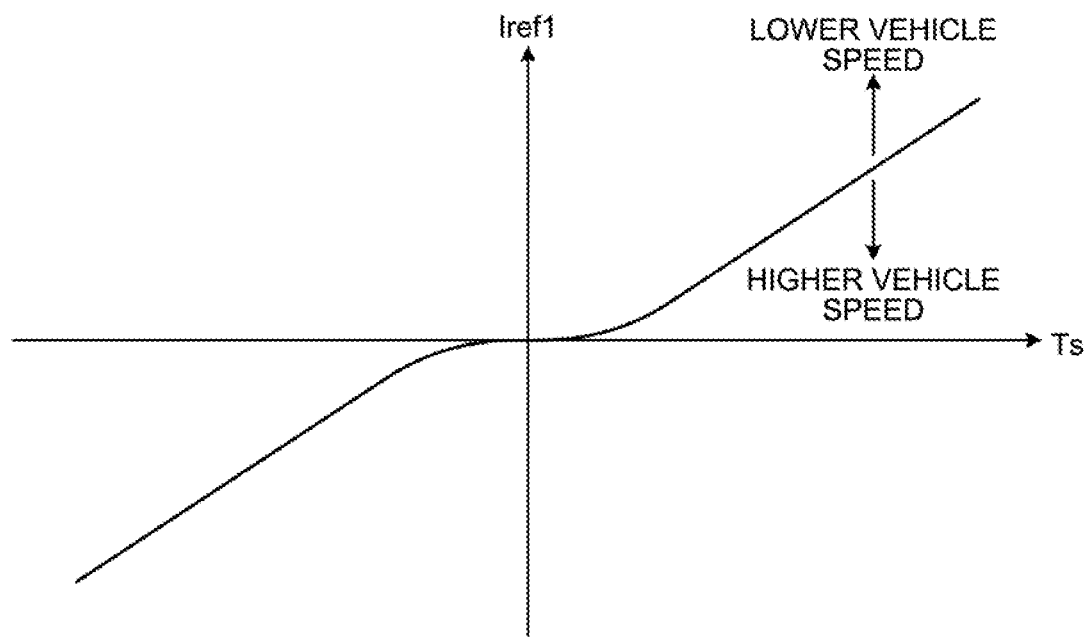
FIG. 4 is a view illustrating an example of an assist map.

FIG. 4 is a view illustrating an example of the assist map. The assist map is what is called a look-up table. In the example illustrated in FIG. 4, the horizontal axis shows the steering torque Ts, and the vertical axis shows the current command value Iref1. In the present embodiment, the assist map has the characteristics of the current command value Iref1 changing in accordance with the steering torque Ts. In the present embodiment, the assist map also has the characteristics of the current command value Iref1 decreasing with a higher (faster) vehicle speed and the current command value Iref1 increasing with a lower (slower) vehicle speed. Note that FIG. 4 illustrates characteristics at a certain vehicle speed.

A lane departure determining unit 34 determines whether the vehicle is departing from the lane, or whether the vehicle has the possibility of departing from the lane (whether the vehicle is in a state of lane departure), on the basis of the image information Ms input from the camera 15, for example. When the vehicle is in a state of lane departure, the lane departure determining unit 34 outputs a predetermined excitation signal VC. The dimension of the excitation signal VC is a current value. The excitation signal VC includes a sine wave at 20 Hz, for example. Note that the frequency of the excitation signal VC is not limited thereto. The excitation signal VC may also be a square wave or a triangular wave including a fundamental wave of a predetermined frequency, for example. The lane departure determining unit 34 only needs to determine whether the vehicle is in a state of lane departure, and the method for determining lane departure by using the lane departure determining unit 34 does not limit the present disclosure.

An adding unit 32A adds the excitation signal VC from the lane departure determining unit 34 to the current command value Iref1. Thus, a current command value Iref2 is obtained in which the excitation signal VC has been superposed on the current command value Iref1. The current command value Iref2 in which the excitation signal VC has been superposed on the current command value Iref1 is then input to a current limiting unit 33.

The current limiting unit 33 limits the maximum current of the current command value Iref2 and generates a current command value Irefm. A subtracting unit 32B calculates a deviation I (Irefm-Im) between the current command value Irefm from the current limiting unit 33 and the current detection value Im fed back from the motor 20 side.

A PI control unit 35 outputs the voltage control command value Vref obtained by performing PI control on the deviation I (Irefm-Im) between the current command value Irefm and the current detection value Im.

A PWM control unit 36 drives the motor 20 by PWM through an inverter circuit 37 on the basis of the voltage control command value Vref.

A current detector 38 detects and feeds the current detection value Im of the motor 20 back to the subtracting unit 32B. The inverter circuit 37 has field-effect transistors (hereinafter referred to as FETs), for example, used as a driver element, and is made up of FETs bridge circuit.

With the structure described above, when the lane departure determining unit 34 has determined that the vehicle is in a state of lane departure, the motor 20 applies vibrations to the steering wheel 1.

Figure 5:
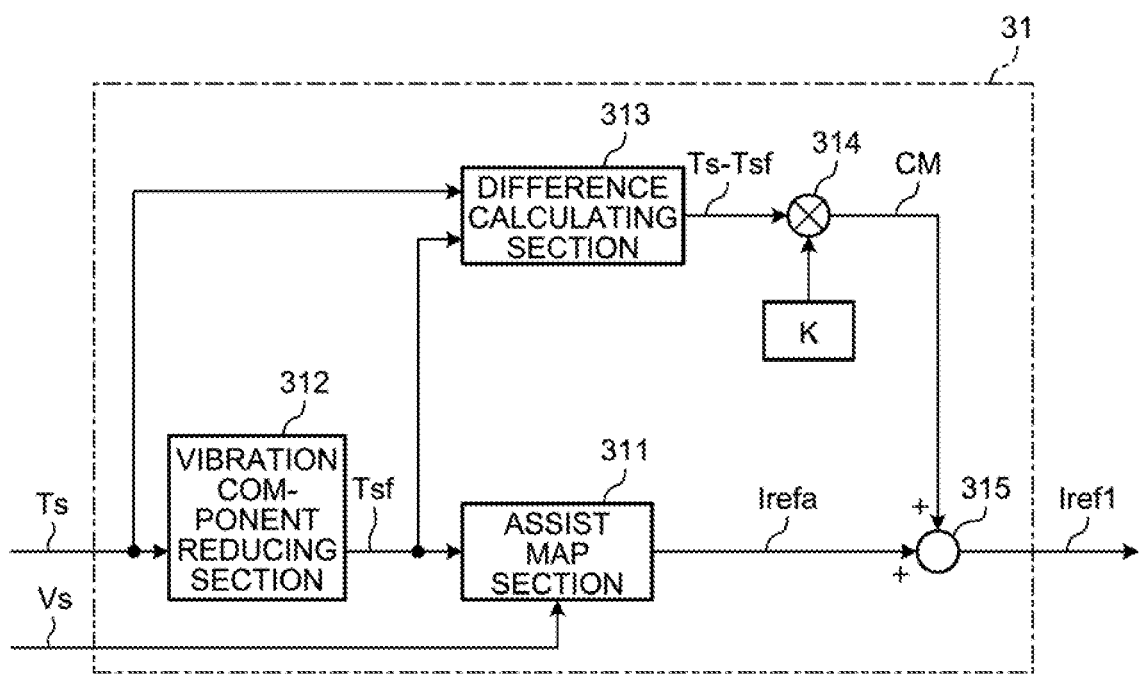
FIG. 5 is a block diagram illustrating a structure example of a current command value calculating unit according to a first embodiment.

FIG. 5 is a block diagram illustrating a structure example of the current command value calculating unit according to the first embodiment. As illustrated in FIG. 5, the current command value calculating unit 31 according to the first embodiment includes an assist map section 311, a vibration component reducing section 312, a difference calculating section 313, a multiplying section 314, and an adding section 315.

To the vibration component reducing section 312, the steering torque Ts is input. The vibration component reducing section 312 outputs a torque signal Tsf in which a vibration component included in the steering torque Ts is reduced.

The detected value of the steering torque Ts includes a vibration component resulting from the vibrations for warning that have been transmitted to the steering wheel 1 by the excitation signal VC output from the lane departure determining unit 34 described above.

Figure 6:
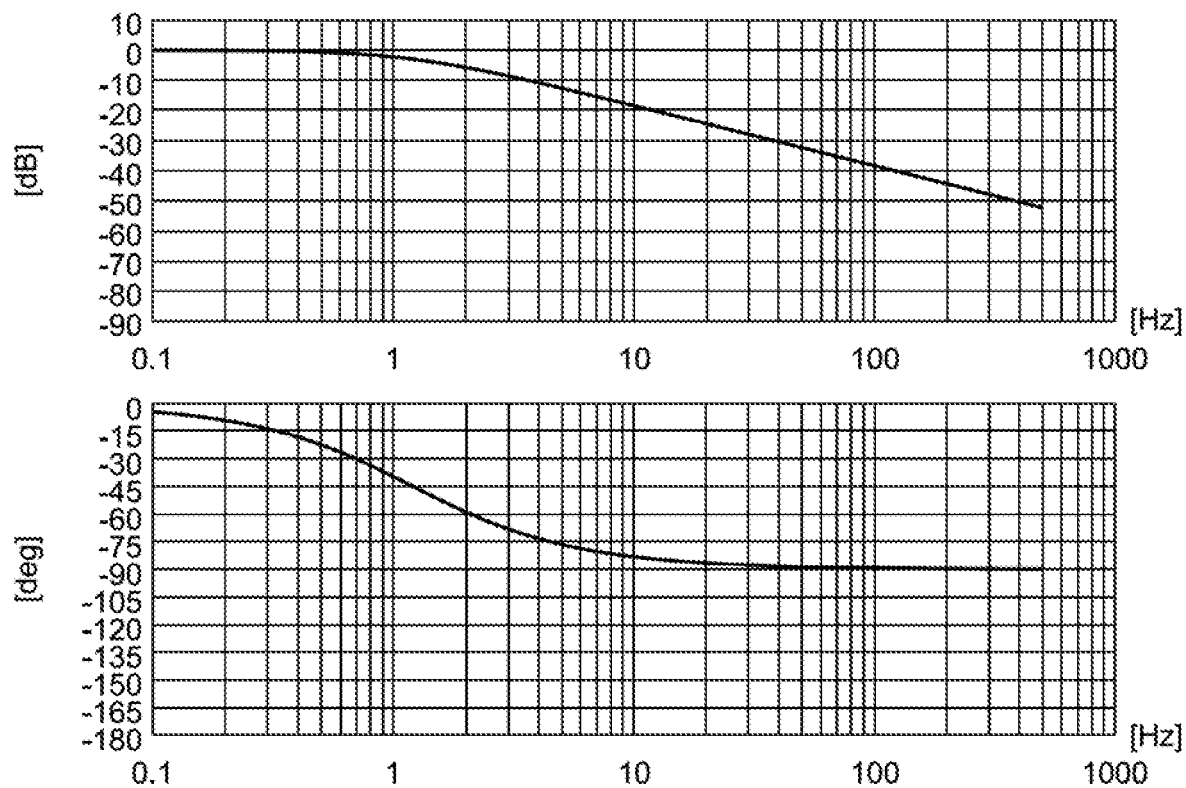
FIG. 6 is a view illustrating a first characteristics example of a vibration component reducing section.
Figure 7:
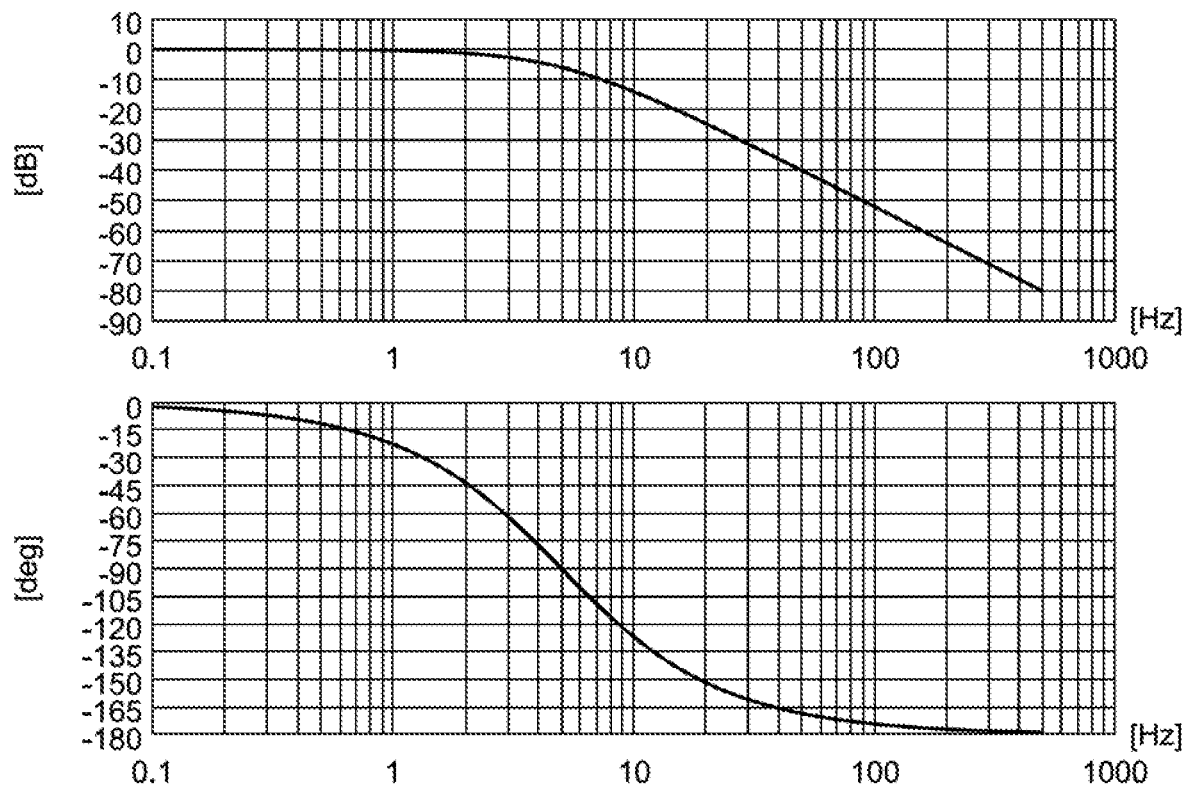
FIG. 7 is a view illustrating a second characteristics example of the vibration component reducing section.
Figure 8:
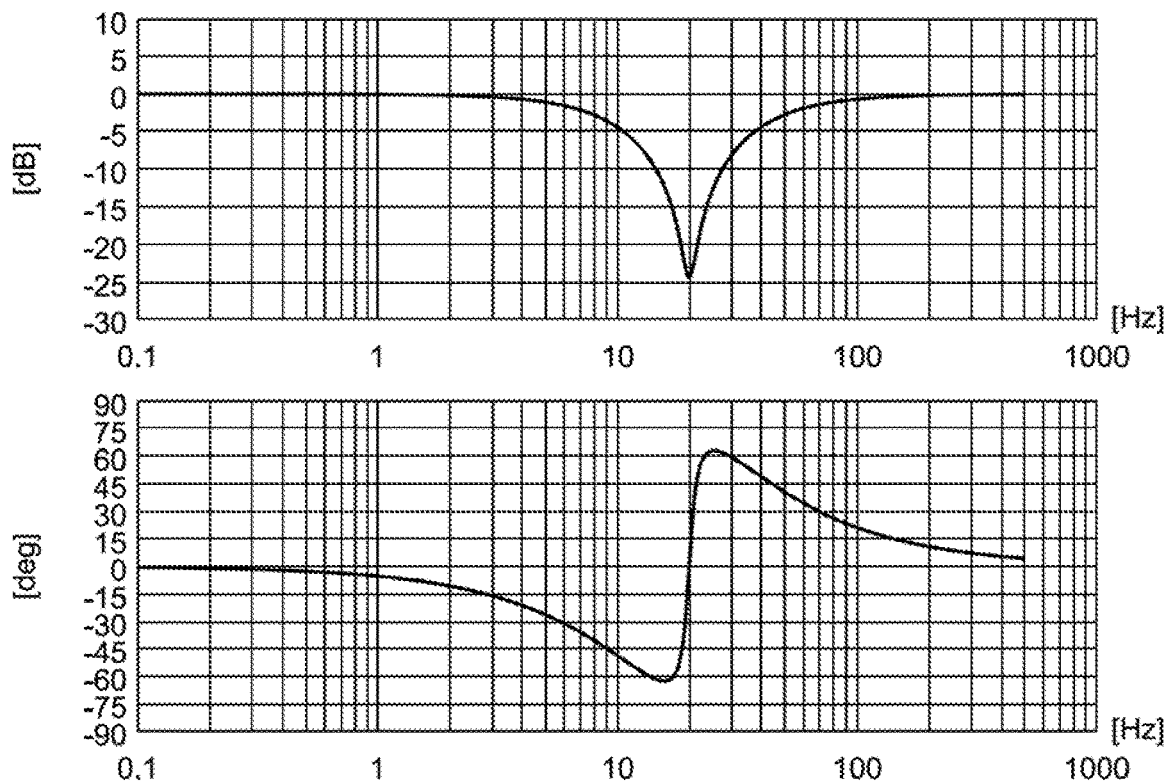
FIG. 8 is a view illustrating a third characteristics example of the vibration component reducing section.
Figure 9:
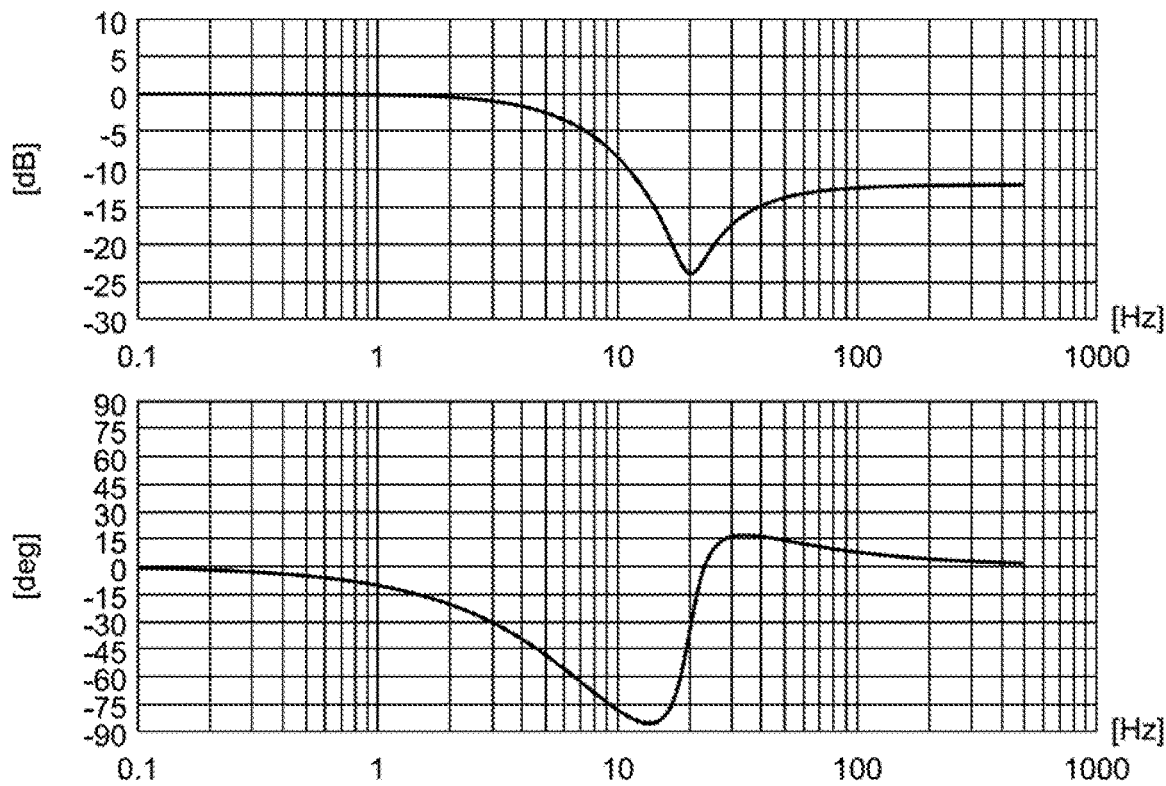
FIG. 9 is a view illustrating a fourth characteristics example of the vibration component reducing section.

FIG. 6 is a view illustrating a first characteristics example of a vibration component reducing section. FIG. 7 is a view illustrating a second characteristics example of the vibration component reducing section. FIG. 8 is a view illustrating a third characteristics example of the vibration component reducing section. FIG. 9 is a view illustrating a fourth characteristics example of the vibration component reducing section. In each example illustrated in FIG. 6 to FIG. 9, the upper diagram illustrates gain characteristics, and the lower diagram illustrates phase characteristics. FIG. 6 to FIG. 9 each illustrate the characteristics in a case in which the vibration component applied to the steering wheel 1 is a sinusoidal component at 20 Hz.

The vibration component reducing section 312 may be a primary low-pass filter having such characteristics as illustrated in FIG. 6, for example. Alternatively, the vibration component reducing section 312 may be a secondary low-pass filter having such characteristics as illustrated in FIG. 7, for example. Alternatively, the vibration component reducing section 312 may be a notch filter having such characteristics as illustrated in FIG. 8, for example. Alternatively, the vibration component reducing section 312 may be a low-pass type notch filter having such characteristics as illustrated in FIG. 9, for example. The vibration component reducing section 312 only needs to reduce the vibration component included in the steering torque Ts, and the characteristics of the vibration component reducing section 312 do not limit the present disclosure.

In a case in which the excitation signal VC includes a harmonic component of a fundamental wave, such as a square wave or a triangular wave, the vibration component reducing section 312 is preferably in a mode in which a frequency higher than that of the fundamental component (20 Hz, for example) of the excitation signal VC, like the primary low-pass filter illustrated in FIG. 6, the secondary low-pass filter illustrated in FIG. 7, or the low-pass type notch filter illustrated in FIG. 9, for example, is reduced.

To the assist map section 311, the torque signal Tsf and the vehicle speed Vs are input. The assist map section 311 outputs a current command value Irefa corresponding to the torque signal Tsf and the vehicle speed Vs by using the assist map illustrated in FIG. 4.

To the difference calculating section 313, the steering torque Ts and the torque signal Tsf are input. The difference calculating section 313 calculates and outputs a torque difference value (Ts-Tsf) between the steering torque Ts and the torque signal Tsf.

The multiplying section 314 outputs a compensation signal CM obtained by multiplying the torque difference value (Ts-Tsf) by a predetermined gain factor K. In the present embodiment, the gain factor K is set in advance and is stored in a storage such as the ROM 1002. The gain factor K has a function of converting the dimension of the torque difference value (Ts-Tsf) from the torque value to a current value.

The adding section 315 outputs the current command value Iref1 in which the compensation signal CM has been added to the current command value Irefa.

Differences from a comparative example in which the vibration component reducing section 312, the difference calculating section 313, the multiplying section 314, and the adding section 315 are not provided will be described.

Figure 10:
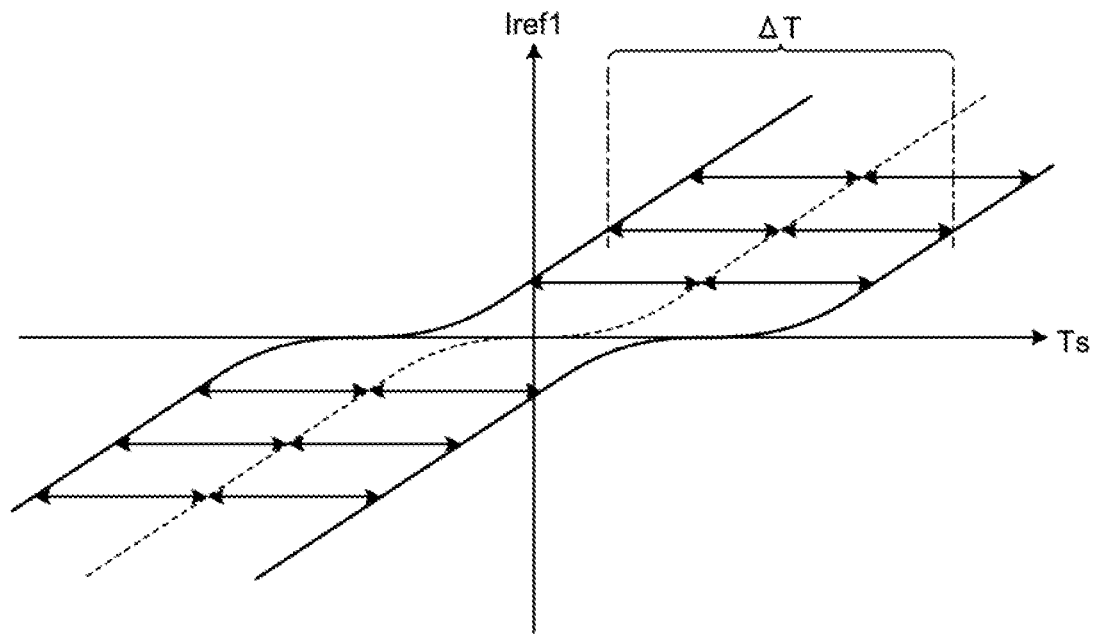
FIG. 10 is a view illustrating steering torque when vibrations are applied to a steering wheel.
Figure 11:
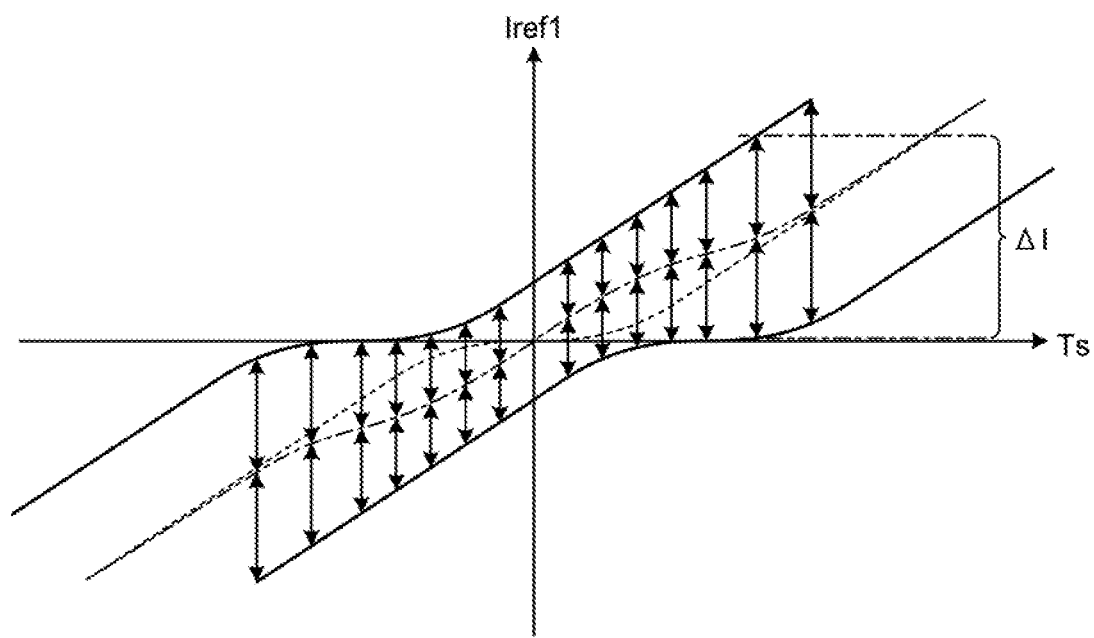
FIG. 11 is a view illustrating a substantial current command value corresponding to the steering torque illustrated in FIG. 10.

FIG. 10 is a view illustrating the steering torque when vibrations are applied to the steering wheel. FIG. 11 is a view illustrating a substantial current command value corresponding to the steering torque illustrated in FIG. 10. In the examples illustrated in FIG. 10 and FIG. 11, the horizontal axis shows the steering torque Ts, and the vertical axis shows the current command value Iref1. In the examples illustrated in FIG. 10 and FIG. 11, broken lines indicate current command values in a case in which vibrations are not applied to the steering wheel 1.

As indicated by solid lines in FIG. 10, when vibrations are applied to the steering wheel 1 by the excitation signal VC, the steering torque Ts fluctuates in accordance with the amplitude value of the excitation signal VC with a uniform fluctuation range ΔT.

Meanwhile, a fluctuation range ΔI in the current direction varies in accordance with the steering torque Ts, as illustrated in FIG. 11. At that time, the substantial current command value excluding the vibration component is a mean value of the fluctuation range ΔI (dash-dotted lines illustrated in FIG. 11).

In other words, in the comparative example, when vibrations are applied to the steering wheel 1 by the excitation signal VC, the substantial current command value excluding the vibration component deviates from the current command value in a case in which vibrations are not applied to the steering wheel 1. In the region in which the steering torque is relatively small, in particular, the deviation is increased from the case in which vibrations are not applied to the steering wheel 1, so that a steering feel is changed.

Meanwhile, in the structure according to the present embodiment, the torque signal Tsf in which the vibration component resulting from the excitation signal VC is reduced is used to obtain the current command value Irefa. As a result, the fluctuation range ΔT of the torque signal Tsf (see FIG. 10) can be decreased. The fluctuation range ΔI in the current direction (see FIG. 11) is decreased accordingly, which can decrease the deviation of the substantial current command value Irefa when vibrations are applied to the steering wheel 1 from the current command value Irefa in the case in which vibrations are not applied to the steering wheel 1.

Additionally, in the structure according to the present embodiment, the compensation signal CM obtained by multiplying the torque difference value (Ts-Tsf) by the predetermined gain factor K and converting the resultant value to a current value is added to the current command value Irefa output from the assist map section 311. In this manner, the current command value Iref1 is obtained in which the attenuated frequency component and the compensated phase by the vibration component reducing section 312.

Figure 12:
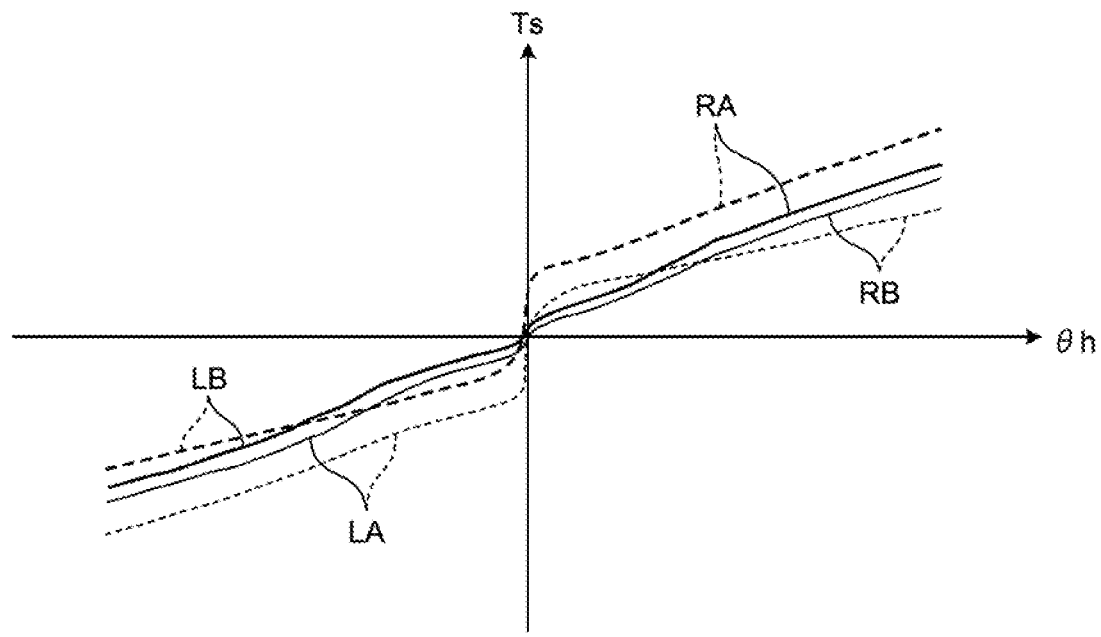
FIG. 12 is a view illustrating an example of simulation results of a comparative example.
Figure 13:
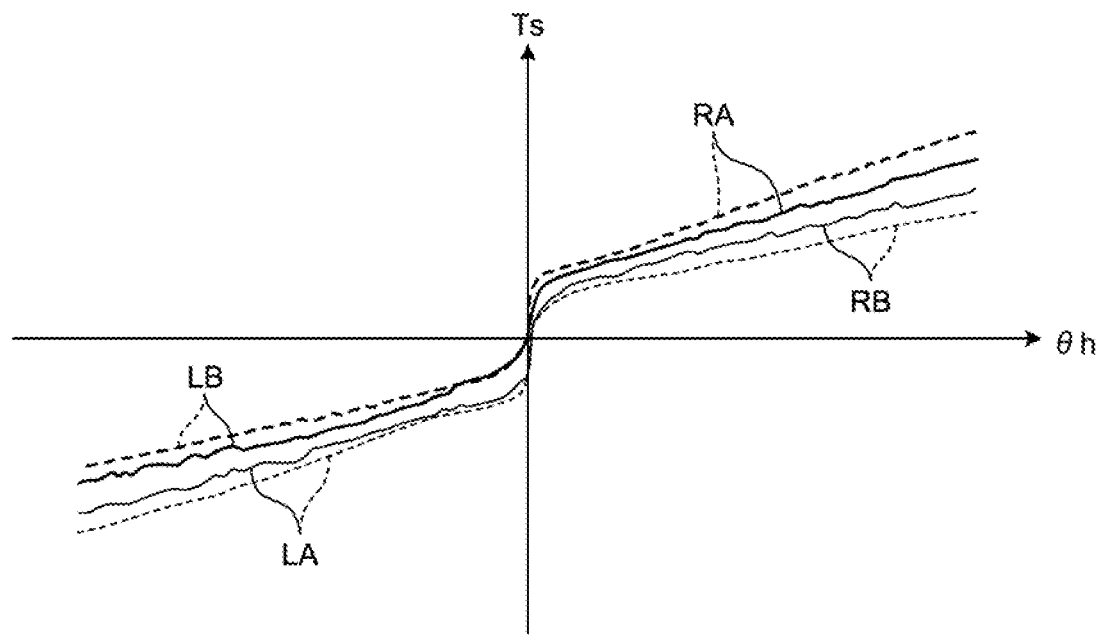
FIG. 13 is a view illustrating an example of simulation results of the first embodiment.

FIG. 12 is a view illustrating an example of simulation results of the comparative example. FIG. 13 is a view illustrating an example of simulation results of the first embodiment. In FIG. 12 and FIG. 13, the horizontal axis shows the steering angle θh, and the vertical axis shows the steering torque Ts. Also, in FIG. 12 and FIG. 13, broken lines indicate simulation results when vibrations are not applied to the steering wheel 1, and solid lines indicate simulation results when vibrations are applied to the steering wheel 1.

As illustrated in FIG. 12, the differences are large between the case in which vibrations are not applied to the steering wheel 1 and the case in which vibrations are applied to the steering wheel 1 in the comparative example. Thus, the steering feel changes greatly between the case in which vibrations are not applied to the steering wheel 1 and the case in which vibrations are applied to the steering wheel 1. Specifically, in the case in which vibrations are applied to the steering wheel 1, the amount of change in the steering torque Ts at about a steering angle of zero degrees at which a shift from turning back from the left (LB) to increasing turn to the right (RA) or a shift from turning back from the right (RB) to increasing turn to the left (LA) occurs, in particular, is smaller than that in the case in which vibrations are not applied to the steering wheel 1.

Meanwhile, the differences between the case in which vibrations are not applied to the steering wheel 1 and the case in which vibrations are applied to the steering wheel 1 are smaller in the structure of the first embodiment than those in the comparative example. Thus, compared to the comparative example, the change in the steering feel can be reduced between the case in which vibrations are not applied to the steering wheel 1 and the case in which vibrations are applied to the steering wheel 1. Specifically, the differences are smaller than those in the comparative example between the amount of change in the steering torque Ts at about a steering angle of zero degrees in the case in which vibrations are applied to the steering wheel 1 and the amount of change in the steering torque Ts at about a steering angle of zero degrees in the case in which vibrations are not applied to the steering wheel 1.

Although the present embodiment has illustrated the example in which, the vehicle is in a state of lane departure, the lane departure determining unit 34 outputs the predetermined excitation signal VC to apply vibrations to the steering wheel 1, the structure is not limited thereto. The structure may be such that vibrations for warning other than the lane departure warning are applied to the steering wheel 1.

As described above, the electric power steering system according to the first embodiment includes the current command value calculating unit 31 configured to output the current command value Iref1 in accordance with the steering torque Ts and the vehicle speed Vs on the basis of the assist map. The current command value calculating unit 31 includes the vibration component reducing section 312 configured to reduce the vibration component resulting from the vibrations for warning that have been transmitted to the steering wheel and included in the steering torque Ts.

With the structure described above, assist control can be performed in which a change in the steering feel is reduced that is made by the vibration component resulting from the vibrations for warning, such as a lane departure warning.

The current command value calculating unit 31 also multiplies the difference value (Ts-Tsf) between the steering torque Ts and the torque signal Tsf, which is output from the vibration component reducing section 312, by the predetermined gain factor K, and adds the resultant value to the current command value Irefa.

In this manner, the current command value Iref1 is obtained in which the attenuated frequency component and the compensated phase by the vibration component reducing section.

Second Embodiment

Figure 14:
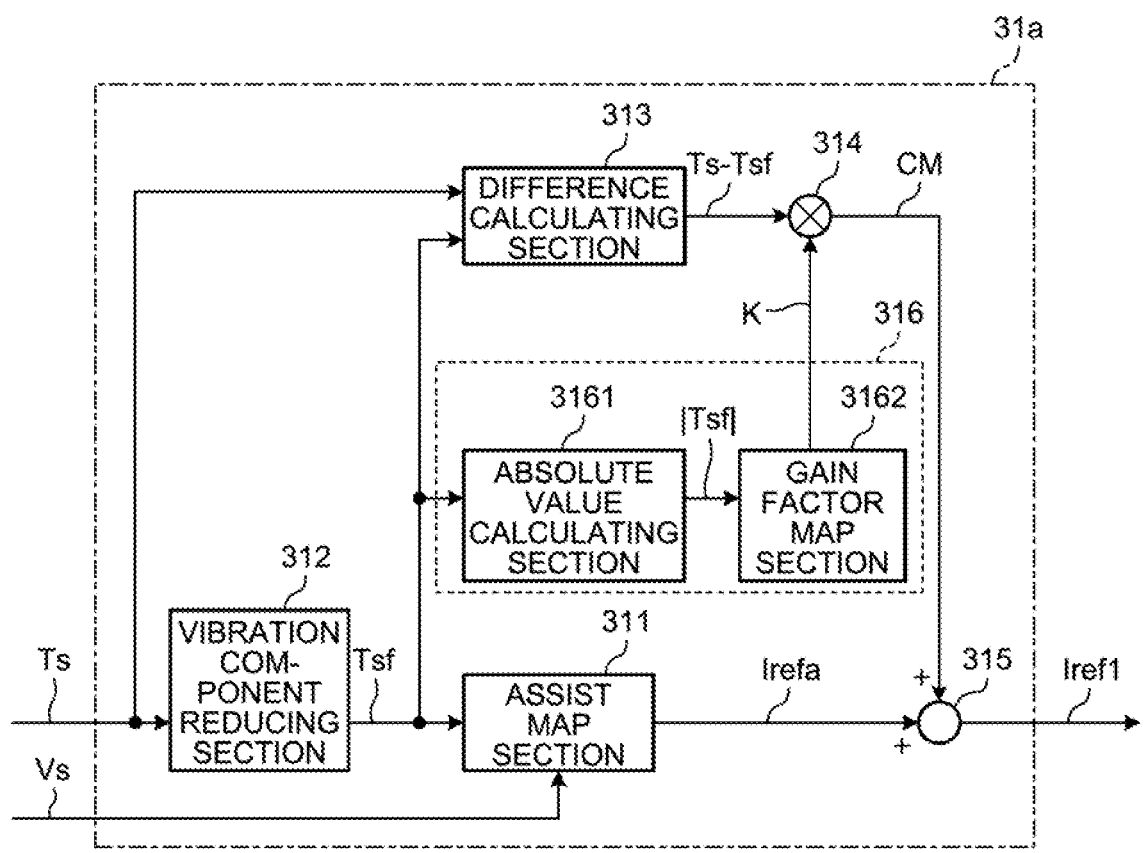
FIG. 14 is a block diagram illustrating a structure example of a current command value calculating unit according to a second embodiment.

FIG. 14 is a block diagram illustrating a structure example of a current command value calculating unit according to a second embodiment. Note that components having the same structure as that described in the first embodiment mentioned above are given the same reference signs, and that description thereof is omitted. The second embodiment differs from the first embodiment in that the gain factor K by which the torque difference value (Ts-Tsf) is multiplied is varied in accordance with the magnitude (absolute value |Tsf|) of the torque signal Tsf.

A current command value calculating unit 31a according to the second embodiment includes a gain factor calculating section 316, in addition to the structure of the first embodiment. The gain factor calculating section 316 includes an absolute value calculating section 3161 and a gain factor map section 3162.

To the absolute value calculating section 3161, the torque signal Tsf is input. The absolute value calculating section 3161 calculates and outputs the absolute value |Tsf| of the torque signal Tsf.

To the gain factor map section 3162, the absolute value |Tsf| of the torque signal Tsf is input. The gain factor map section 3162 refers to a gain factor map stored in advance on the basis of the absolute value |Tsf| of the torque signal Tsf, and calculates and outputs the gain factor K by which the torque difference value (Ts-Tsf) output from the difference calculating section 313 is multiplied. In the present embodiment, the gain factor map is set in advance and is stored in a storage such as the ROM 1002.

Figure 15:
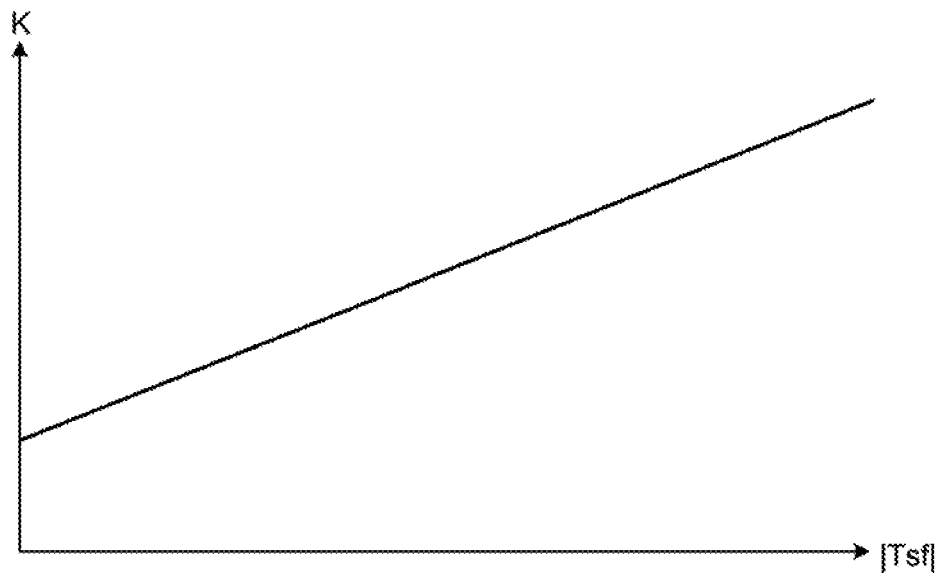
FIG. 15 is a view illustrating a first example of a gain factor map.
Figure 16:
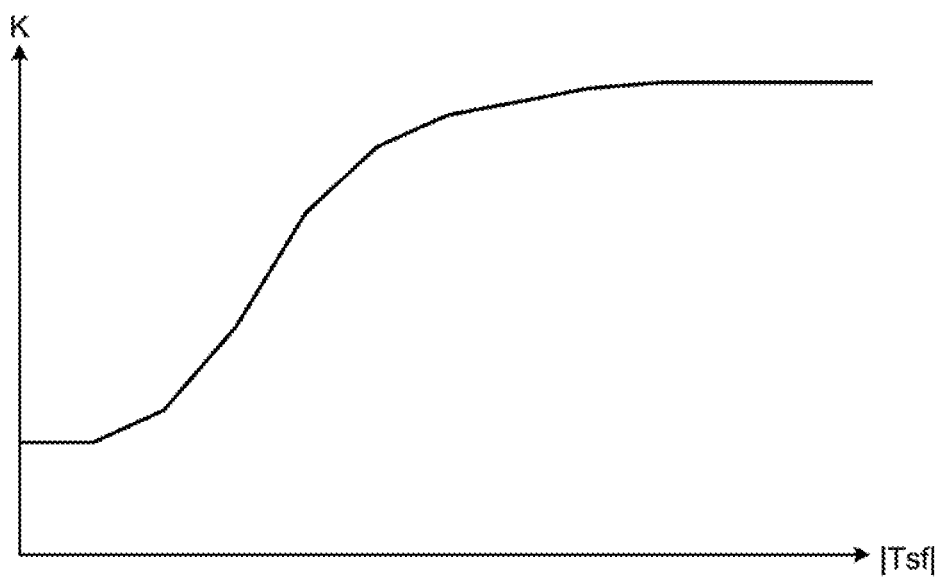
FIG. 16 is a view illustrating a second example of a gain factor map.

FIG. 15 is a view illustrating a first example of the gain factor map. FIG. 16 is a view illustrating a second example of the gain factor map. The gain factor map is what is called a look-up table. In the examples illustrated in FIG. 15 and FIG. 16, the horizontal axis shows the absolute value |Tsf| of the torque signal Tsf, and the vertical axis shows the gain factor K.

In the present embodiment, the gain factor map has the characteristics of the gain factor K increasing with an increase in the absolute value |Tsf| of the torque signal Tsf. In this manner, the stability of assist control in the electric power steering system can be improved.

In the example illustrated in FIG. 15, the gain factor map exhibits the characteristics of the gain factor K being a value proportional to the absolute value |Tsf| of the torque signal Tsf.

In the example illustrated in FIG. 16, the gain factor map exhibits the characteristics of the gain factor K being an approximate value for the amount of change ($\Delta$Iref1/$\Delta$Ts) in the assist map (see FIG. 4) in accordance with the absolute value |Tsf| of the torque signal Tsf.

Note that the gain factor map only needs to have such characteristics that the stability of assist control in the electric power steering system can be improved, and that characteristics of the gain factor map do not limit the present disclosure.

As described above, the electric power steering system according to the second embodiment further includes the gain factor calculating section 316 configured to generate the gain factor K in accordance with the absolute value |Tsf| of the torque signal Tsf.

Specifically, the gain factor calculating section 316 generates the gain factor K that is proportional to the absolute value |Tsf| of the torque signal Tsf.

Specifically, the gain factor calculating section 316 also generates the gain factor K that approximates the amount of change in the assist map in accordance with the absolute value |Tsf| of the torque signal Tsf.

In this manner, the stability of assist control in the electric power steering system can be improved.

Although the embodiment mentioned above has described the example of applying vibrations to the steering wheel 1 by adding the excitation signal VC from the lane departure determining unit 34 to the current command value Iref1, the structure is not limited thereto. The structure may be such that an actuator for exciting the steering wheel 1 is provided separately, and that vibrations are applied to the steering wheel 1.

Additionally, the mode may be such that, in a case in which the lane departure determining unit 34 has determined that the vehicle is not in a state of lane departure and that the excitation signal VC is not output, in other words, in a case in which the vibration component for warning is not applied to the steering wheel 1, the vibration component reducing section 312, the difference calculating section 313, the multiplying section 314, the adding section 315, and the gain factor calculating section 316 are disabled.

REFERENCE SIGNS LIST 1 steering wheel
2 column shaft
3 speed reduction mechanism
4a, 4b universal joints
5 pinion rack mechanism
6a, 6b tie rods
7a, 7b hub units
8L, 8R steered wheels
10 torque sensor
11 ignition key
12 vehicle speed sensor
13 battery
14 steering angle sensor
15 camera
20 motor
30 control unit (ECU)
31, 31a current command value calculating units
32A adding unit
32B subtracting unit
33 current limiting unit
34 lane departure determining unit
35 PI control unit
36 PWM control unit
37 inverter circuit
38 current detector
311 assist map section
312 vibration component reducing section
313 difference calculating section
314 multiplying section
315 adding section
316 gain factor calculating section
1001 CPU
1005 interface
1006 A/D converter
1007 PWM controller
1100 control computer (MCU)
3161 absolute value calculating section
3162 gain factor map section

The invention claimed is:

1. An electric power steering system configured to drive a motor based on an assist map in which a current command value in accordance with steering torque and a vehicle speed is defined and configured to perform assist control on a steering system of a vehicle, the electric power steering system comprising:
a current command value calculating unit configured to output a current command value in accordance with the steering torque and the vehicle speed, based on the assist map, wherein
the current command value calculating unit includes a vibration component reducing section configured to reduce a vibration component resulting from vibrations for warning that have been transmitted to a steering wheel, the vibration component being included in the steering torque.

2. The electric power steering system according to claim 1, wherein the current command value calculating unit multiplies a difference value between the steering torque and output from the vibration component reducing section by a predetermined gain factor, and adds a resultant value to the current command value.

3. The electric power steering system according to claim 2, wherein the current command value calculating unit further includes a gain factor calculating section configured to generate the gain factor in accordance with an absolute value of a torque signal, the torque signal being an output from the vibration component reducing section.

4. The electric power steering system according to claim 3, wherein the gain factor calculating section generates the gain factor that is proportional to the absolute value of the torque signal.

5. The electric power steering system according to claim 3, wherein the gain factor calculating section generates the gain factor that approximates an amount of change in the assist map in accordance with the absolute value of the torque signal.

6. The electric power steering system according to claim 1, wherein the vibration component reducing section is a primary low-pass filter, a secondary low-pass filter, a notch filter, or a low-pass type notch filter.

* * * * *